United States Patent [19]

Davis

[11] 4,114,189
[45] Sep. 12, 1978

[54] DIGITAL SIGNAL SYNTHESIS SYSTEM

[75] Inventor: Robert H. Davis, Silver Spring, Md.

[73] Assignee: The United States of America as represented by the Secretary of the Navy, Washington, D.C.

[21] Appl. No.: 639,031

[22] Filed: Dec. 9, 1975

[51] Int. Cl.$^2$ .............................................. G06F 15/34
[52] U.S. Cl. .................................................. 364/718
[58] Field of Search ....................... 235/152, 156, 197; 364/718, 719, 720, 721, 722

[56] References Cited

U.S. PATENT DOCUMENTS

| | | | |
|---|---|---|---|
| 3,649,821 | 3/1972 | Gumacos | 235/152 |
| 3,676,565 | 7/1972 | Rowe | 35/10.4 |
| 3,822,380 | 7/1974 | Forgione | 235/197 |

Primary Examiner—David H. Malzahn
Attorney, Agent, or Firm—R. S. Sciascia; A. L. Branning; R. E. Bushnell

[57] ABSTRACT

A process and an apparatus using an inverse discrete Fourier transform for synthesis of complex waveforms that have one or more sinusoidal components of arbitrary frequency, amplitude and phase. The component sinusoids are formed in segments of a predetermined period and modulated according to a preselected function. The modulation characteristic is compensated for by overlapped concatenation of adjacent segments.

13 Claims, 16 Drawing Figures

DIGITAL SIGNAL SYNTHESIS SYSTEM

BACKGROUND OF THE INVENTION

This invention relates to electronic synthesis of waveforms and more particularly, to the synthesis of complex waveforms that are the sum of one or more discrete sinusoid components.

In prior art synthesis, a contribution is added to one or more cell frequencies of the frequency spectrum of the desired waveform. Segments of the desired waveform in the time domain are then obtained by performing a discrete inverse Fourier transform on the sum on the cell frequencies. The desired waveform is obtained by concatenation of the resulting segments. However, unless the frequencies of the desired waveform equal or are very close to the discrete cell frequencies, successive segments of the waveform will not be phase matched at the segment boundaries and excessive modulation of the resulting waveform will occur. Only by adding contributions to a prohibitive number of spectral cells for each desired sinusoid component can this modulation be avoided.

SUMMARY OF THE INVENTION

The present invention overcomes the disadvantages, inconveniences and limitations of prior art synthesis systems by providing a digital process and apparatus for synthesis of complex waveforms having one or more sinusoidal components with arbitrary frequency, amplitude and phase. By computing and adding spectral contributions to the frequency cells corresponding to a windowing of the time function by the hanning function $A = 0.5 + 0.5$ cosine $[2\pi f_c t]$, where $f_c$ is a cell frequency, a segment of a component sinusoid of the desired waveform that is modulated by a raised cosine pulse of a selected period and unity amplitude is produced. Successive modulated time segments are then overlapped by 50 percent of their period and combined, thereby producing the unmodulated sinusoidal component of the desired waveform. As the spectral components further away from the desired frequency of the window hanned segment of the sinusoid component decrease in magnitude much faster than do a unmodulated spectral components, the resulting sinusoid that is a closer approximation of the component sinusoid is produced while making contributions to fewer spectral components.

One object of the present invention is to provide a process and an apparatus requiring less computational effort for the electronic synthesis of waveforms.

Another object of the present invention is to provide a process and an apparatus for electronic synthesis of waveforms that have one or more sinusoidal components by modulation of the sinusoidal components.

Yet another object of the present invention is to provide a process and an apparatus for approximate digital synthesis of waveforms that have one or more sinusoidal components by making contributions to a minimum number of the spectral cell components nearest the frequency of each of the sinusoidal components of the desired waveform.

A more complete appreciation of this invention and many of the attendant advantages thereof will be readily appreciated as the same becomes better understood by reference to the following detailed description when considered in connection with the accompanying drawings and Attachment "A", a NOL Technical Report, NOLTR 74-215, *Synthesis of Steady-State Signal Components By An All-Digital System*, authored by the present inventor, wherein.

DESCRIPTION OF THE PREFERRED EMBODIMENT

The present invention discloses a process and an apparatus for electronic digital synthesis of complex waveforms having one or more sinusoidal components of arbitrary frequency, amplitude and phase. The component sinusoids are spectrally described by a plurality (i.e., typically a multiple of 2, such as 128 or 1024) of cell frequencies of variable amplitude. Contributions to the frequency cells in the spectral description of the component sinusoids correspond to time waveform segments that are modulated by a raised cosine pulse or another, appropriately selected function. Successively modulated time segments are then overlapped by 50 percent of their period and combined to produce to an unmodulated desired waveform.

Figure 1:
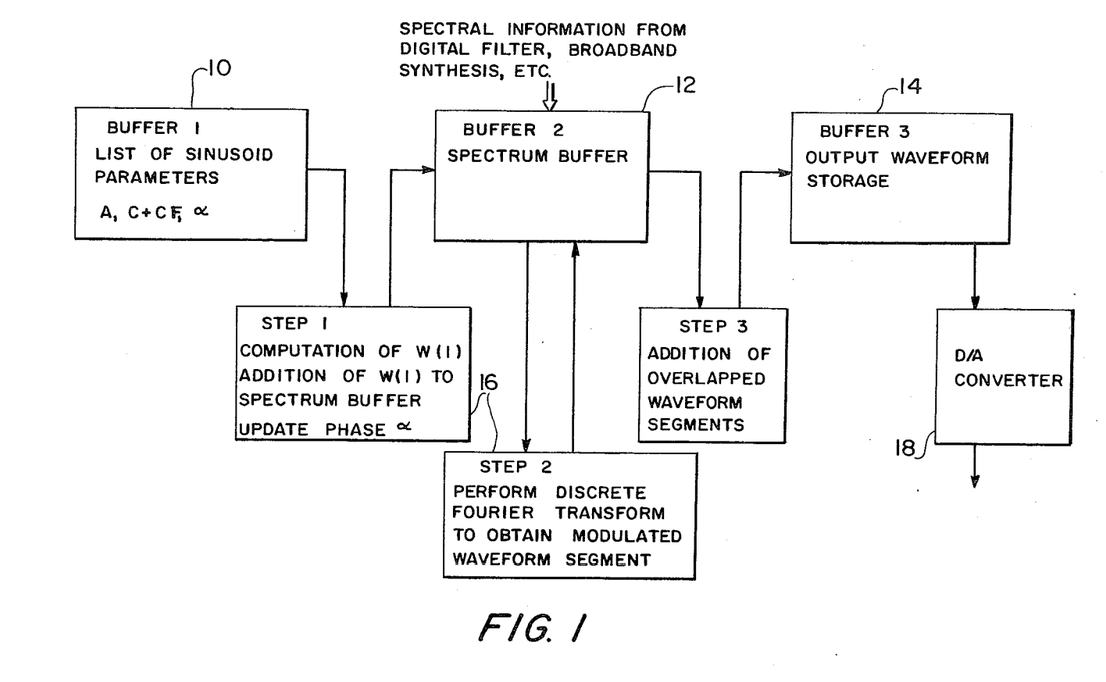
FIG. 1 is a diagrammatic view of a circuit for electronic synthesis of waveforms according to the teachings of the present invention.

Referring now to the drawings, and more particularly to FIG. 1 wherein a diagram of a circuit embodying the invention is shown. The circuit shown in FIG. 1 operates on an algorithm based on the Inverse Discrete Fourier Transform where the contributions to the frequency cells in the spectral description are designed not to produce a segment of the desired sinusoid after transforming, but rather a segment of said sinusoid modulated by a raised cosine pulse. This modulation in the time waveform is what is often referred to as a "hanning windowing." Successive modulated time segments are then overlapped by 50% and combined to produce an unmodulated output. Due to the fact that the spectral components of the hanned segment fall off in magnitude away from the desired frequency much faster than the unmodulated segment, the result is that a close approximation can be attained for the modulated segment much easier than for the unmodulated segment.

The operation of the digital synthesis process is illustrated in FIG. 1. Buffer 10 is a memory or equivalent storage for the Amplitude $A_m$, the Frequency $F_m$, and the current phase $\alpha_m$ for each of the M desired sinusoidal components, where the index of sinusoidal components, $m$, varies from one to M, inclusive. The current phase, $\alpha_m$, of the "$m$" th sinusoid component is the phase of that component at the beginning of the waveform segment being synthesized on the current iteration. Buffer 12 is a working buffer which begins with the spectrum of a waveform (digital filter output, etc.) to which the sinusoidal components are to be added, or is cleared if sinusoids only are to be output. Buffer 14 contains the final time waveform which is output at some desired sample rate through D/A converters, etc.

Buffer 12 is assumed to be initialized by loading with an appropriate spectrum or cleared. Step 1 of each interation of the process is the addition (as described in chapter three of *Synthesis of Steady-State Signal Components By An All-Digital System.*) of a set of complex contributions to the spectral cells in the immediate vicinity of each of the desired sinusoidal components. For a desired component with amplitude $A_m$, frequency $F_m$, and current phase $\alpha_m$ the following computations are performed:

The integer and fractional value $C_m$ and $CF_m$ are determined by dividing the frequency $F_m$ by the spectral cell spacing $F_c$. $C_m + CF_m$ then represents the desired frequency of the "$m$" the component as expressed in units of Spectral cell spacing.

The complex number $W_m(i)$ is added to the spectral cell $C + i$ for the desired values of $i$ (from $-2$ to $+3$ for a six contribution approximation, where $i$ varies from $(-n/2) + 1$ to $n/2$, inclusive, and where $n$ is the number of frequency cells to which a contribution must be made).

$$W_m(i) = Ae^{j\alpha}3^{-j\pi(\frac{N-1}{N})(i-CF)}\sin\pi(i-CF) \cdot$$

$$\left\{ \frac{1}{\sin\frac{\pi}{N}(i-CF)} - \frac{1}{2}\left( \frac{e^{j\pi(\frac{N-1}{N})}}{\sin\frac{\pi}{N}(i-CF-1)} + \frac{e^{j\pi(\frac{N-1}{N})}}{\sin\frac{\pi}{N}(i-CF+1)} \right) \right\}$$

The current phase $\alpha_m$ is updated by incrementing by $\pi (C_m + CF_m)$ radians. Step 1 is complete when the above computations have been completed for each desired sinusoidal component.

At this point, Buffer 12 contains the complete spectrum for one modulated segment of the output waveform. At Step 2 in the process, the appropriate inverse Discrete Fourier Transform algorithm is applied to the data in Buffer 12 to produce a modulated segment of real time waveform data. At step 3 in the process this segment is then overlapped by the first half of its length with, and added to, the second half of the data from the previous segment which is being held temporarily in Buffer 14. This completes the computation for one iteration of the synthesis process, and results in a set of valid data of length equal to one-half of the modulated segment length.

It is important to note that all contributions to the spectral data in Buffer 12 must be compatible with the overlap and add process of step 3. Examples of signal processing operations which are compatible with this process are the "overlap-add" method of digital filtering by FFT based convolution of the component segments as well as the broadband synthesis process.

After the new set of valid data is ready in buffer 14, it is available for use either in digital form or as an analog waveform by outputting samples at a regular rate through a Digital to Analog Converter.

Normally either four ($i = -1, 0, 1, 2$) or six ($i = -2, -1, 0, 1, 2, 3$) non-zero contributions are sufficient to produce output waveforms with an acceptable error and spectral sidelobes. However, additional components may be added for improved performance.

A further development of the principles of the present invention are disclosed in Attachment "A" *Synthesis of Steady-State Signal Components By An All-Digital System,* which is herein incorporated by reference.

IFFT GENERATION OF DISCRETE FREQUENCIES

The Exact Synthesis Algorithm

In an analog system, the generation of a sinusoidal waveform is usually implemented by constructing an oscillator having the desired frequency. The direct adaptation of this approach to discrete or line frequency generation by a digital system requires a second order difference equation with a pole at the desired frequency. As a general digital synthesis technique, this approach has problems with stability due to a coefficient quantization, as well as the disadvantage that each frequency requires a separate generator. On the other hand samples of the desired sinusoid are generated one at a time, and thus for a small number of discrete frequencies desired, the meager storage requirements are attractive relative to block processing techniques. However, for the case where the sum of many discretes is desired, significant computational savings can be obtained by utilizing block processing with the Fast Fourier Transform (FFT).

Implementation of a general second-order difference equation requires about the same amount of computation as an FFT butterfly. Generation of N samples of a single sinusoid by difference equation requires N such computations, whereas generation of N samples by IFFT requires $(N/2)\log_2 N$ computations for the transform plus whatever computation is required to specify the desired sinusoid in the DFT domain. Thus, for N on the order of 1000, generation of the sum of more than 5 discretes begins to favor the FFT approach unless an unreasonable amount of computation is required to specify the lines in the sample frequency space input to the IFFT.

For generation of discretes with frequencies that are exactly equal to the cell frequencies $f_c = f_s/N$, where $f_s$ is the sampling frequency, the specification in the sampled frequency domain is trivial. Consider the IFFT of N/2 single-sided complex frequency coefficients $F_k$, $k = 0, 1 \ldots N/2 - 1$, to produce N time samples $f_n$, $n = 0$ ... N−1. A non-zero $F_k$, say $F_{k_1}$, will result in a contribution to the output time segment of exactly $k_1$ cycles of a sinusoid (period — $N/k_1$ sample periods), with a magnitude and a phase relative to the beginning of the segment determined by the complex coefficient $F_{k_1}$. Since successive segments generated with the same $F_{k_1}$ will match perfectly at the segment boundaries, the result will be a perfect sinusoid (sampled, of course) with frequency $$\frac{k_1}{N} f_s$$

Thus for independent discretes with frequencies in multiples of $f_s/N$, a single complex number added to the appropriate spectral cell before each inverse transform will result in the desired sinusoid added to the output time waveform.

For frequencies that are not exact multiples of $f_s/N$, the situation is considerably less straight-forward. Since the discrete Fourier Transform (DFT) is information lossless and reversible, the easiest way to see what is required to generate arbitrary frequency sinusoids is to consider the forward transform of successive segments of the desired waveform. First consider the (complex to complex) DFT of an arbitrary complex exponential $w(t)$ given by:

$$w(t) = e^{j(2\pi f_a t + \alpha)} \tag{1}$$

where $f_a$ is between 0 and $f_s/2$, and $\alpha$ is the phase at the beginning of the segment of length $NT_s$ from which N samples have been taken. Let $f_a$ be expressed as:

$$f_a = (m + d)\frac{f_s}{N} \tag{2}$$

where $$\frac{f_s}{N}$$

is the cell spacing, and $m$ is an integer and $d$ less then unity.

$$m\frac{f_s}{N}$$

is then the next lowest cell frequency, and $d$ is the fraction of a cell spacing that $f_a$ is above $$m\frac{f_s}{N}.$$

The sampled version of $w(t)$ is then:

$$w^*(t) = \sum_{n=-\infty}^{\infty} e^{j\alpha} e^{j2\pi(m+d)\frac{f_s}{N} nT_s} \delta(t - nT_s) \tag{3}$$

and the samples of the segment of interest are:

$$W(n) = e^{j(\frac{2\pi}{N}(m+d)n + \alpha)}, n = 0, 1 \ldots N-1 \tag{4}$$

where the fact that $f_s T_s = 1$ has been noted. The DFT is then:

$$W(k) = \frac{1}{N} \sum_{n=0}^{N-1} e^{j\alpha} e^{j\frac{2\pi n}{N}(m+d)} e^{-j\frac{2\pi nk}{N}} \tag{5}$$

Removing the phase angle from the sum and combining the exponential arguments, $$W(k) = \frac{e^{j\alpha}}{N} \sum_{n=0}^{N-1} e^{-j\frac{2\pi n}{N}(k-m-d)}. \tag{6}$$

To briefly digress, consider a truncated summation of the form $$S = \sum_{n=0}^{N-1} \lambda^n \tag{7}$$

Manipulating, $$\lambda S = \sum_{n=1}^{N} \lambda^n = \lambda^N + S - 1 \tag{8}$$

$$S - \lambda S = 1 = \lambda^N \tag{9}$$

or, $$S = \frac{1 - \lambda^N}{1 - \lambda}. \tag{10}$$

Suppose $\lambda$ is a complex exponential such that S is of the form:

$$S = \sum_{n=0}^{N-1} e^{-j\frac{2\pi}{N} nu}. \tag{11}$$

Applying equation 10, with $\lambda = e$:

$$S = \frac{1 - e^{-j2\pi u}}{1 - e^{-j\frac{2\pi}{N} u}} \tag{12}$$

Factoring an $e^{j\pi u}$ from the numerator and an $$e^{-j\frac{\pi}{N} u}$$

from the denominator, $$S = \frac{e^{-j\pi u}}{e^{-j\frac{\pi}{N} u}} \left( \frac{e^{j\pi u} - e^{-j\pi u}}{e^{j\frac{\pi}{N} u} - e^{-j\frac{\pi}{N} u}} \right) \tag{13}$$

or, $$S = e^{-j\pi(\frac{N-1}{N})u} \left( \frac{\sin \pi u}{\sin \frac{\pi}{N} u} \right) \tag{14}$$

Using the definition:

$$\sin d_N(u) = \frac{1}{N} \frac{\sin \pi u}{\sin \frac{\pi}{N} u}, \tag{15}$$

the desired result is:

$$\sum_{n=0}^{N-1} e^{-j\frac{2\pi}{N} nu} = N e^{-j\pi(\frac{N-1}{N})u} \sin d_N(u). \tag{16}$$

Figure 2:
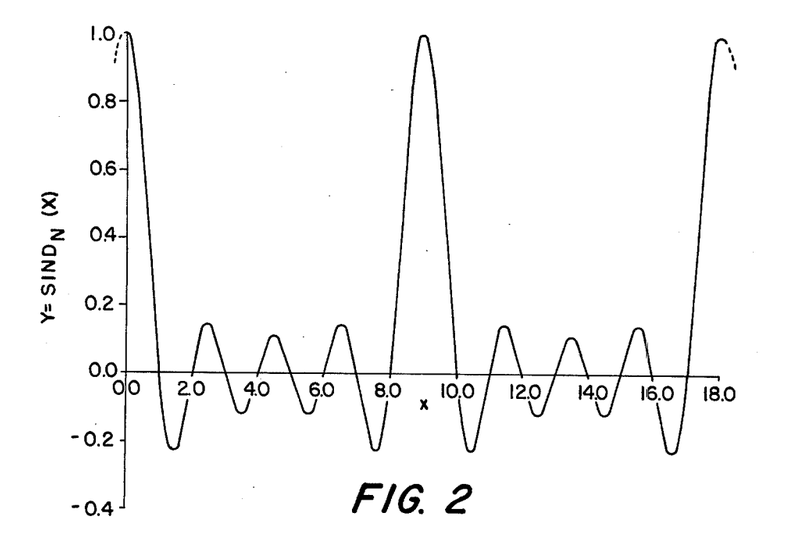
FIG. 2 is a graph of the $SIND_N(X)$ function for N equal to nine.

The $\text{sind}_N(u)$ function is plotted in FIG. 2 for N=9. Note that for $u$ equal to integral multiples of N, the sind has unit magnitude; for all other integral values of $u$, the sind is zero. For even N, the peaks alternate between plus and minus one; for odd N all peaks are positive unity. The $\text{sind}_N(u)$ is always periodic with period 2N; the magnitude (or square) is periodic with period N.

Then, equation (6) becomes:

$$W(k) = e^{j\alpha} e^{-j\frac{\pi}{N}(N-1)(k-m-d)} \text{sind}_N(k-m-d) \quad (17)$$

If $d=0$, only $W(m) = e^{j\alpha}$ is non-zero as was noted above. However, for any non-zero $d$, $0 < d < 1$, all $W(k)$ are non-zero. The magnitude of the $W(k)$ are governed by the $\text{sind}_N(k\text{-}m\text{-}d)$ form, and the phases are governed by $$e^{+j(\alpha - \pi\frac{(N-1)}{N}(k-m-d))},$$

where $\alpha$ is the desired phase angle at the beginning of the segment.

For a real time function, $$w(t) = e^{j(2\pi f_a t + \alpha)} + e^{-j(2\pi f_a t + \alpha)}. \quad (18)$$

By linearity of the DFT, the corresponding sampled spectra of a sampled segment is given by the sum of two terms at $\pm f_a$, $$W(k) = \frac{e^{j\alpha}}{N} e^{-j\frac{\pi}{N}(k-m-d)} \text{sind}_N(k-m-d) \quad (19)$$
$$+ \frac{e^{-j\alpha}}{N} e^{j\frac{\pi}{N}(k+m+d)} \text{sind}_N(k+m+d).$$

To avoid unnecessary complication in the math, the following arguments will be in terms of generating a single complex exponential. The corresponding real sinusoid is easily obtained by summing a pair of conjugately symmetric exponentials at $\pm f_a$, the desired frequency.

The required synthesis algorithm is thus to add contributions to every spectral cell (for each discrete frequency desired) according to equation (17) or (19). Since there will be exactly $m+d$ cycles of the required sinusoid in each N sample segment, the phase angle $\alpha$ must be increased by $2\pi d$ radians for the generation of successive segments to maintain continuity from one segment to the next.

An M Cell Approximation

The computation of the W($k$) for N/2 spectral cells to generate N output samples obviously requires more computational effort than direct generation of the sinusoid in the time domain, even before considering the overhead of computing the inverse DFT. Thus the exact solution using FFT techniques is not practical unless the required frequencies can be constrained to the set $f_a = nf_o$, $n=0, \pm 1 \ldots \pm N/2-1$.

If, on the other hand, something less than perfection is acceptable, an approximate solution may yield the hoped for computational savings. Since most of the power in the spectral domain is contained in cells near the desired frequency, it would seem reasonable to approximate the complete spectral description by truncating the tails of the $\text{sind}_N(x)$ envelope by some other equivalent operation. This could result in an acceptable number of coefficients to be specified for each segment of each discrete required in the output. If a 1024 complex 2048 real IFFT is being utilized and if only 10 non-zero coefficients per discrete will produce acceptable output results, the generation of 10 complex coefficients in the spectral domain becomes quite attractive relative to having to generate 2048 numbers in the time domain for each sinusoid desired.

Assume that only the M largest (in magnitude) contributions per complex exponential are to be retained unmodified in the sampled frequency domain. Since the contributions of all other cells are to be eliminated, the total power is decreased by the sum of the squared magnitudes of the eliminated spectral components. In fact, due to the orthogonality of the Fourier frequencies, the M largest components form at least mean squared error estimate of the original signal if only M cells may be non-zero. Thus if mean squared error is an acceptable criteria, adding the M largest contributions based on either equation (17) (for single sided spectra) or equation 19 (for double sided spectra) yields the optimum approximation.

Since the $\text{sind}_N(x)$ envelope of the spectral magnitudes decreases monotonically on either side of the desired frequency, zeroing all but the M largest components is equivalent to multiplying the spectrum by a pulse or "window" of unit magnitude and width $$M\frac{f_s}{N}.$$

Multiplication in the frequency domain is equivalent to convolving the time function (sinusoidal segment) with the transform of the window. The resulting time function segment can be determined by an inverse DFT of the windowed spectrum, $$s(n) = \sum_{k=-\frac{M}{2}+1}^{m+\frac{M}{2}} W(k) e^{j\frac{2\pi nk}{N}}. \quad (20)$$

Using equation (6), $$s(n) = \sum_{k=-\frac{M}{2}+1}^{m+\frac{M}{2}} e^{j\alpha} \sum_{l=0}^{N-1} \frac{1}{N} e^{-j\frac{2\pi l}{N}(k-m-d)} e^{j\frac{2\pi nk}{N}}. \quad (21)$$

Interchanging the order of summation and refactoring the exponentials, $$s(n) = \quad (22)$$
$$e^{j\alpha} \sum_{l=0}^{N-1} e^{-j\frac{2\pi l}{N}(m+d)} \sum_{k=m-\frac{M}{2}+1}^{m+\frac{M}{2}} e^{j\frac{2\pi k}{N}(n-l)}.$$

Factoring an $$e^{j\frac{2\pi m}{N}(n-l)}$$

from the last summation and modifying the summation limits correspondingly, $$s(n) = e^{j\alpha} \sum_{l=0}^{N-1} \frac{1}{N} e^{j\frac{2\pi l}{N}(m-d)} e^{j\frac{2\pi m}{N}(n-l)} \sum_{k=-\frac{M}{2}+1}^{\frac{M}{2}} e^{j\frac{2\pi k}{N}(n-l)} \quad (23)$$

Factoring the original sinusoid from the summations, and reordering again, $$s(n) = e^{j\alpha} e^{j\frac{2\pi n}{n}(m+d)} \sum_{k=-\frac{M}{2}+1}^{\frac{M}{2}} e^{j\frac{2\pi n}{N}(k-d)} \frac{1}{N} \sum_{l=0}^{N-1} e^{-j\frac{2\pi}{N}l(k-d)} \quad (24)$$

the last sum is just the $\text{sind}_N(k-d)$, so:

$$s(n) = e^{j\alpha} e^{j\frac{2\pi n}{N}(m+d)} \sum_{k=-\frac{M}{2}+1}^{\frac{M}{2}} e^{j\frac{2\pi n}{N}(k-d)} e^{j\frac{\pi}{N}(N-1)(k-d)} \text{sind}_N(k-d). \quad (25)$$

or, finally, the desired form, $$s(n) = e^{j\alpha} e^{j\frac{2\pi n}{N}(m+d)} \sum_{k=-\frac{M}{2}+1}^{\frac{M}{2}} e^{j\frac{\pi}{N}(k-d)(2n-N+1)} \text{sind}_N(k-d). \quad (26)$$

This is just the desired sinusoidal segment, but modulated by a gain factor which is dependent on both $n$ and $d$.

Figure 3:
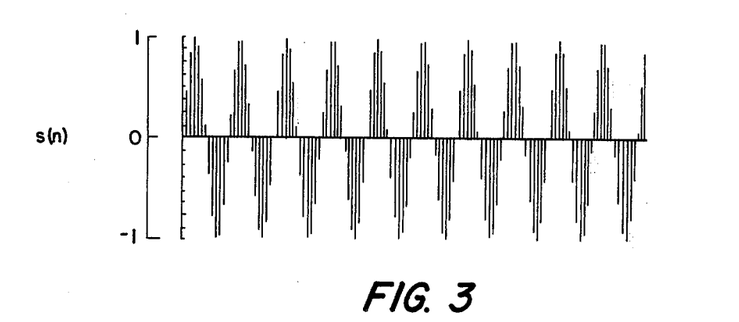
FIG. 3 is a graph showing 128 samples of 10.25 cycles of a sinusoid component.
Figure 4:
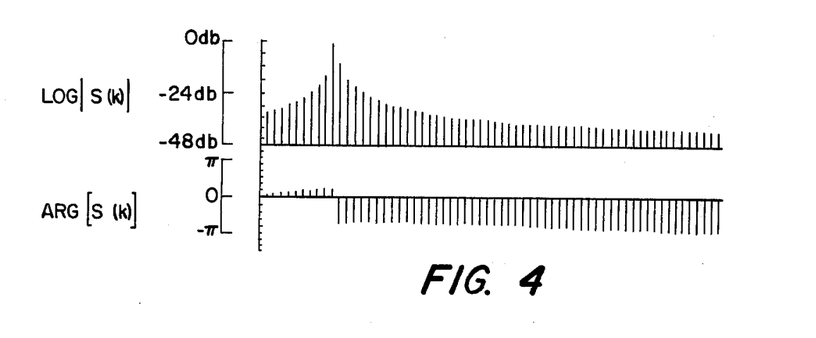
FIG. 4 is a logarithmic magnitude-phase spectrum of a 10.25 cycle segment.
Figure 5:
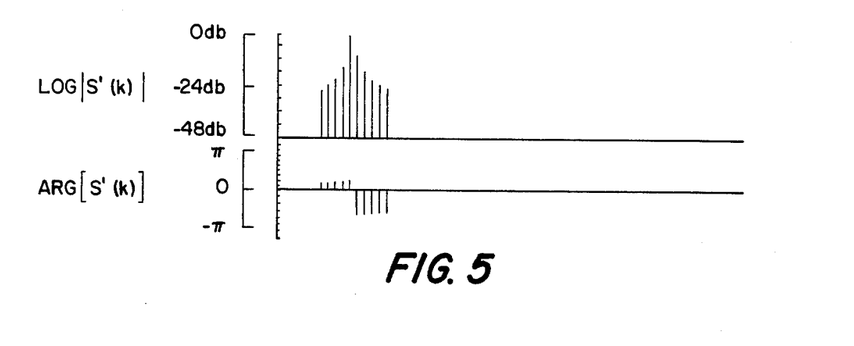
FIG. 5 is a truncated spectrum of an approximation segment.
Figure 6:
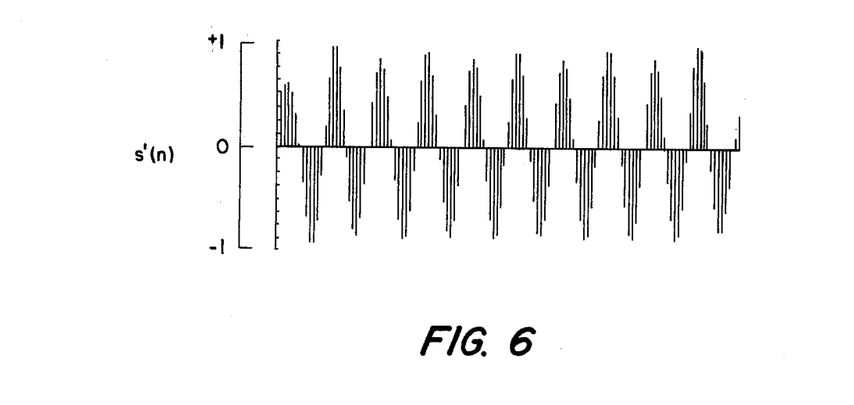
FIG. 6 shows an approximate time segment waveform.

An example is helpful in illustrating the result of the uniform window approximation. FIG. 3 shows a 128 sample function segment which covers 10.25 cycles of a sinusoid. FIG. 4 is the corresponding 64 point single sided spectra derived by DFT. Note the 180° phase difference for components just above and just below the actual frequency. A uniform window of width M=10 is applied to produce the approximation spectra in FIG. 5. An inverse DFT then gives the approximation time segment shown in FIG. 6.

Figure 7:
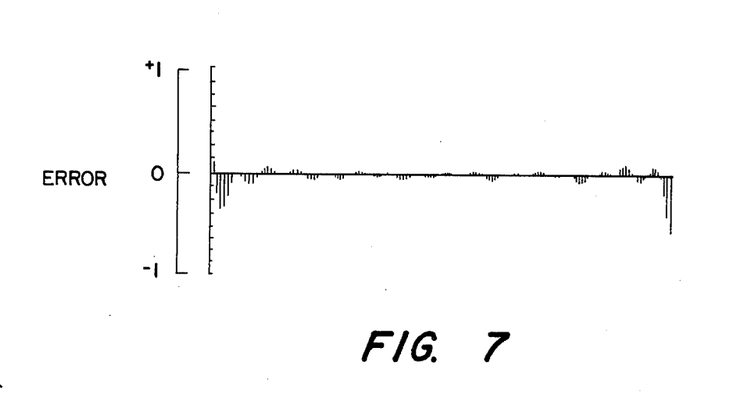
FIG. 7 shows a segment error $s'(n) - s(n)$ for the waveform in FIG. 6.

Crudely speaking, the major effect of truncating the tails of the segment spectrum is to attempt to "match up" the two ends of the segment. This is to be expected since the "end-around" discontinuity, or equivalently, the discontinuity from one "cycle" to the next of the periodic waveform represented, cannot be sustained without the frequency components contained in the tails of the spectrum. The error for the example given is shown in FIG. 7, and is representative of the relative size of the error at the ends of a segment versus the center portion.

Figure 8:
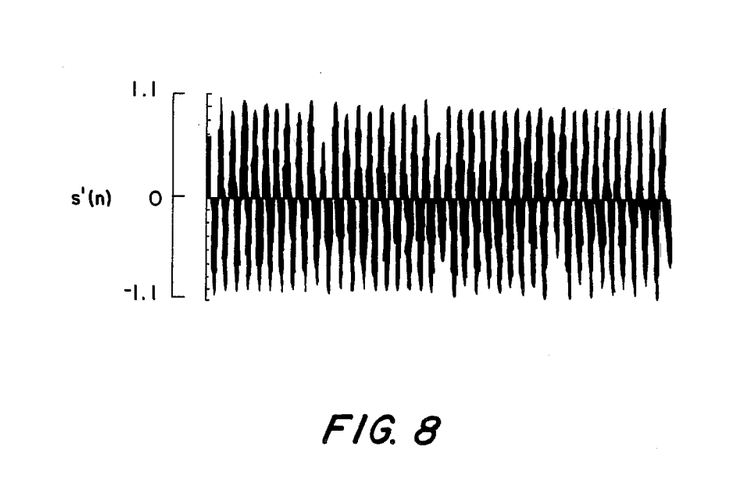
FIG. 8 shows a composite time segment of a 512 sample approximation waveform.
Figure 9:
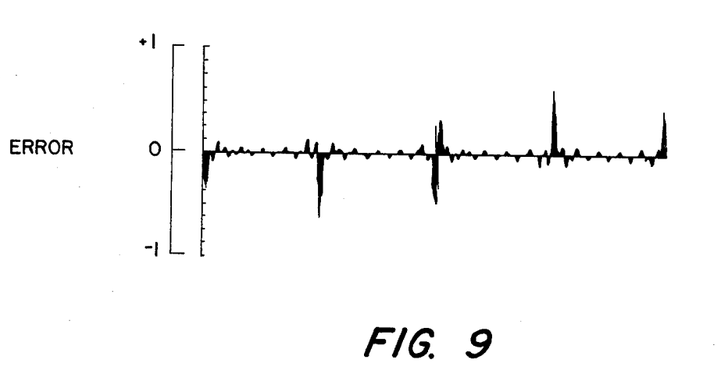
FIG. 9 shows a graph of the error function of the composite waveform shown in FIG. 8.

A composite time segment was constructed by concatenating four segment approximations derived as in the example above, but initial phases of 0, $\pi/2$, $\pi$, and $3\pi/2$ radians, respectively. The resultant time block contains 512 samples covering a total of the desired sinusoid, and is shown in FIG. 8. Note the rather severe effective modulation of the signal envelope in the vicinities of the segment boundaries. The error function for the composite waveform is shown in FIG. 9, and has a maximum value of 0.55 relative to a perfect (i.e., all spectral components preserved) waveform amplitude of $\pm 1$. The maximum excursion of the approximation waveform has a relative amplitude of 1.09.

Figure 10:
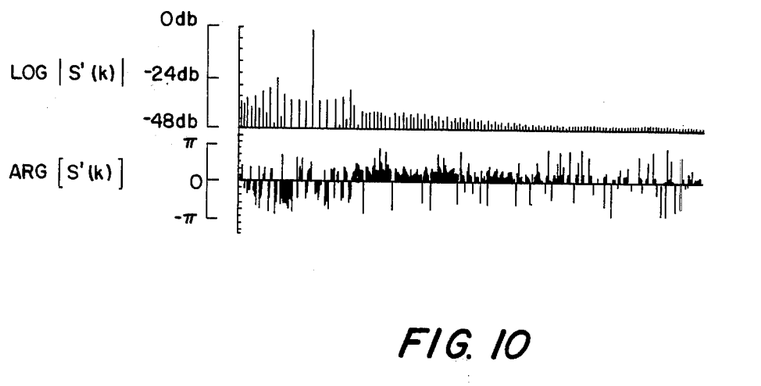
FIG. 10 shows the logarithmic magnitude-phase spectrum corresponding to the composite approximate waveform shown in FIG. 8.

The spectrum of the composite approximation waveform is shown in FIG. 10. The largest undesired component is about 24 db below the desired signal strength. Note that the major error components are at frequencies $f_a \pm n/NT_s$, where $f_a$ is the desired frequency and $NT_s$ is the length of each approximation segment. This is the behavior expected in the frequency domain corresponding to the effect described above of the time waveform being effectively modulated on a once per segment rate.

If the criterion of acceptability is other than minimum mean square error, such as ratio of desired signal to largest undesired component or minimum amplitude modulation of the time function, the uniform window may not be the best solution. Shading of the window coefficients was briefly pursued, but in general decreased side lobe strengths were obtainable only at the expense of increases in amplitude modulation in the time function. In addition, the fact that the spectral truncation operation reduces the "end-around" discontinuity for each segment means that discontinuities are created in the composite output waveform at the segment boundaries. Although increased fidelity can be achieved by using a wider window, any computational advantages of the technique are soon lost. It appears, then, that this particular FFT based algorithm is not very useful unless a rather coarse approximation is acceptable, preferably with only a mean square error fidelity requirement.

The "Overlapped-Hanned" Algorithm

The fact that the major difficulty encountered in the above algorithm was an effective modulation of each segment suggests the possibility of purposely introducing a specific modulation characteristic and to compensate by overlapping and summing adjacent segments, (i.e., introduce redundant processing). This is all the more attractive if the desired discrete components are to be combined with a specified broadband signal, since it was shown in Chapter 2 of Appendix A that a two-times redundancy factor yielded a fairly satisfactory broadband algorithm. If the same factor of 2 can be exploited for the discrete case, the approximation coefficients can be added to the broadband spectra before transforming, and thus one IFFT does all.

Since the contributions in each of the overlapped segments add coherently to form the total signal for the discrete case, the sine pulse weighting used for the broadband algorithm is not applicable. A triangular pulse modulation form meets the requirement in the time domain, but is not obtainable by simple manipulation of the spectrum of the signal. On the other hand, the raised cosine modulation (corresponding to "Hanning" shading) of the segment appears to be an almost perfect solution to the problem. Overlapped signal segments that have been modulated by the Hanning pulse $p_H(t)$:

$$p_H(t) = \begin{cases} .5 + .5 \cos 2\pi t/NT_s; & |t| < NT_s/2 \\ 0; & |t| \geq NT_s/2 \end{cases} \quad (27)$$

will add perfectly to produce the original waveform. The question thus becomes: can the Hanned segment be more easily approximated than the unmodulated segments?

Returning to the spectrum of the unweighted segment, equation (17), the spectrum of the Hanned segment $W_H(k)$ is obtained by convolving with the transform of $\frac{1}{2}(1 + \cos 2\pi n/N)$. The latter is the well known $P_H(k)$, $$P_H(k) = -\frac{1}{4}\delta(k+1) + \frac{1}{2}\delta(k) - \frac{1}{4}\delta(k-1) \quad (28)$$

i.e., impulses at zero frequency and at ± one frequency cell $$\frac{f_s}{N}.$$

Convolving equation (17) with equation (29) the result is:

$$W_H(k) = \quad (29)$$

$$e^{j\alpha} e^{j\pi(\frac{N-1}{N})d} \left[ (\frac{1}{2} e^{-j\pi(\frac{N-1}{N})(k-m)} \text{sind}_N(k-m-d) - \right.$$

$$\frac{1}{4} e^{-j\pi(\frac{N-1}{N})(k-m+1)} \text{sind}_N(k+1-m-d) -$$

$$\left. \frac{1}{4} e^{-j\pi(\frac{N-1}{N})(k-m-1)} \text{sind}_N(k-1\ m-d) \right].$$

Manipulating and writing out the sind functions, $$W_H(k) = \quad (30)$$

$$\frac{1}{2N} e^{j\alpha} e^{j\pi(\frac{N-1}{N})d} e^{-j\pi(\frac{N-1}{N})(k-m)} \frac{\sin\pi(k-m-d)}{\sin\frac{\pi}{N}(k-m-d)} -$$

$$\frac{1}{2} e^{-j\pi(\frac{N-1}{N})} \frac{\sin[\pi(k-m-d)+\pi]}{\sin[\frac{\pi}{N}(k-m-d+1)]} -$$

$$\frac{1}{2} e^{j\pi(\frac{N-1}{N})} \frac{\sin[\pi(k-m-d)-\pi]}{\sin[\frac{\pi}{N}(k-m-d-1)]}.$$

In the last two terms, $\sin[\pi(k-m-d)\pm\pi]$ is just $-\sin[\pi(k-m-d)]$, which can then be factored out of the brackets. Since the approximation is concerned with the $W_H(k)$ for $k$ near $m$, sin $$\pi \frac{(k-m-d\pm 1)}{N}$$

is approximately equal to $$\pi \frac{(k-m-d\pm 1)}{N}$$

for reasonably large N, say on the order of $10^3$. Similarly the factor $$(\frac{N-1}{N})$$

appearing in the exponentials is approximately unity for N large. Thus, for $k$ in the vicinity of $m$, $$W_H(k) \approx \quad (31)$$
$$\frac{1}{2N} e^{j\alpha} e^{j\pi d} e^{j\pi(k-m)} \sin[\pi(k-md)] \frac{N}{\pi} \frac{1}{(k-m-d)} +$$

$$\frac{1}{2(k-m-d+1)} + \frac{1}{2(k-m-d-1)}$$

Factoring $$a \frac{1}{(k-m-d)}$$

from inside the brackets and combining, $$W_H(k) \approx \frac{1}{2} e^{j(\alpha+\pi d)} . \quad (32)$$

$$(-1)^{(k-m)} \frac{\sin\pi(k-m-d)}{\pi(k-m-d)} \cdot (\frac{-1}{(k-m-d)^2-1})$$

The magnitudes for the frequency contributions around $k = m$ are given by the factor in brackets. The phases are determined by $\alpha + \pi d$, plus some number of $\pi$ rotations determined by $k - m$ in the last exponential, and the sign of the factor in brackets. In the example given below, it is shown that these factors of $(-1)^n$ are responsible for three consecutive phase shifts of $\pi$ radians each in the vicinity of $k = m$.

The approximate $W_H(k)$, given by equation (32), to be generated for the synthesis algorithm has the following exploitable characteristic. As was noted before, only the phase $\alpha$ changes for any of the $W_H(k)$ from one segment to the next. Furthermore, the only phases required are either $\alpha + \pi d$ or $\alpha + \pi d + \pi$. Thus, if M magnitudes are computed and stored for an M cell approximation, only one cosine and one sine are needed to determine the real and imaginary parts to be added to the synthesized spectrum for each segment. Note that unless a particular phase is required, the initial phase $(\alpha+\pi d)$ for the first segment can be arbitrary, and all that is required thereafter is to increase the $\alpha+\pi d$ term by $\pi d$ on each iteration.

Since the primary virtue of Hanning weighting is to greatly reduce the sidelobes of the sinc(x) DFT filter function, it provides almost the same reduction in the tails of the $\text{sind}_N(x)$ form of equation (17). The result is that, although as before perfect synthesis requires contributions in all frequency cells, the Hanning modulated discrete segment achieves a very close approximation with many fewer non-zero components.

Figure 11:
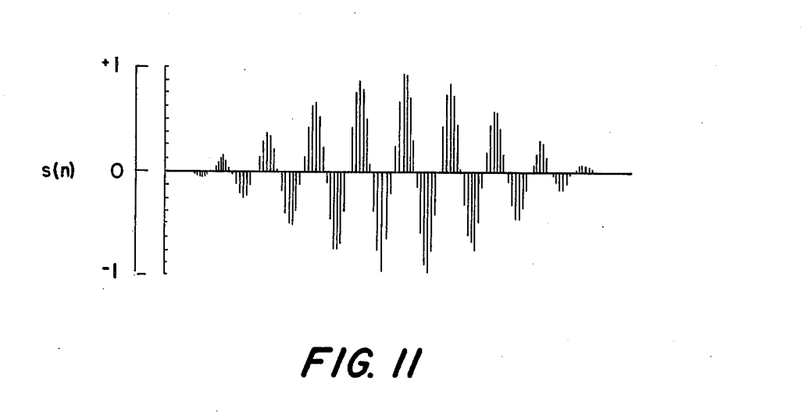
FIG. 11 shows the 10.25 cycle, 128 segment shown in FIG. 3 after modulation by a raised cosine pulse.
Figure 12:
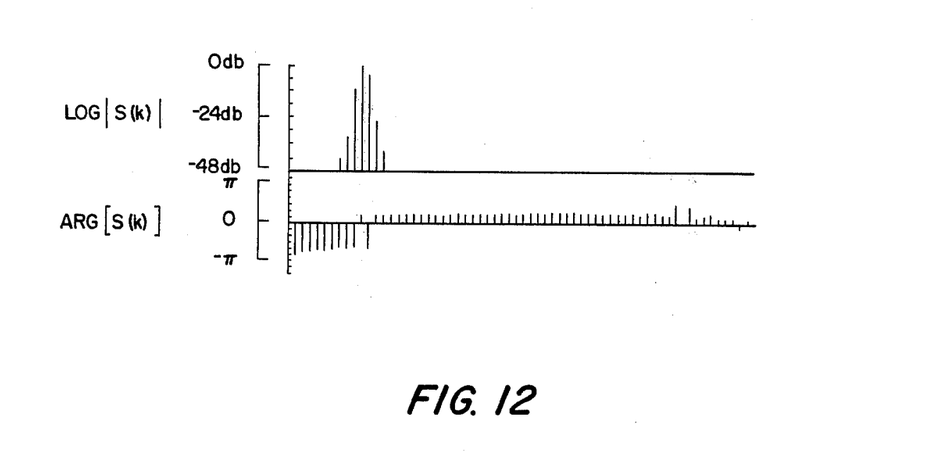
FIG. 12 shows the logarithmic magnitude-phase spectrum corresponding to the segment shown in FIG. 11.

The basic parameters of the previous example were repeated in the example below illustrating the application of the "overlap-Hanned" algorithm. A set of time function segments, each consisting of 10.25 cycles in 128 points, with phases incremented by $2\pi/8$ rad. for each successive segment, are forward transformed, Hanned, tails truncated, inverse transformed and combined to form a composite output time function of 41 cycles in 512 points as before. FIG. 11 shows the same 10.25 cycle segment as shown in FIG. 3, but after modulation by the raised cosine pulse, of "Hanning". The corresponding spectrum is shown in FIG. 12. Note that the tails of the spectrum have been reduced considerably, such that barely four components on each side of the actual frequency are within the 48 db range plotted. Note in addition that the phase undergoes three shifts of $\pi$ radians each in the immediate vicinity of the desired frequency, compared to the single $\pi$ radian shift shown in FIG. 4 for the unHanned segment.

Figure 13:
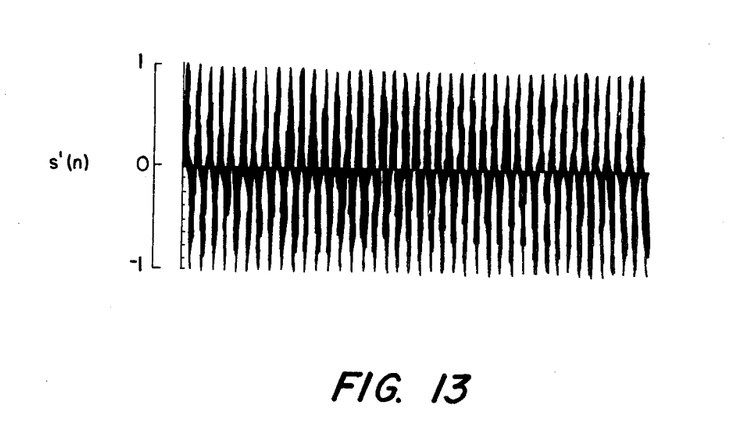
FIG. 13 shows a composite 512 sample approximation waveform obtained from eight overlapped-Hanned segments.
Figure 14:
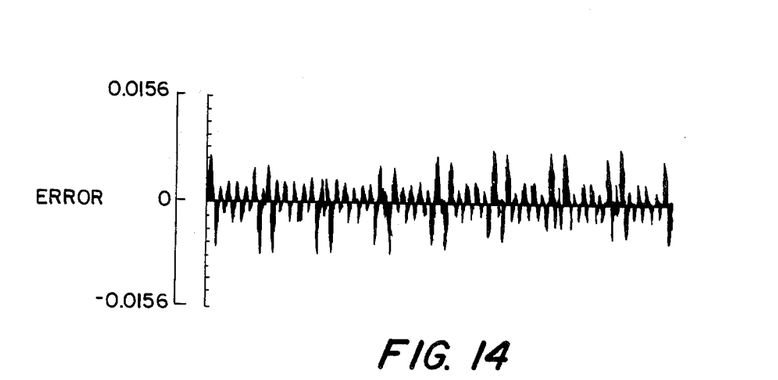
FIG. 14 shows the error function $s'(n) - s(n)$ for the composite approximation shown in FIG. 13.
Figure 15:
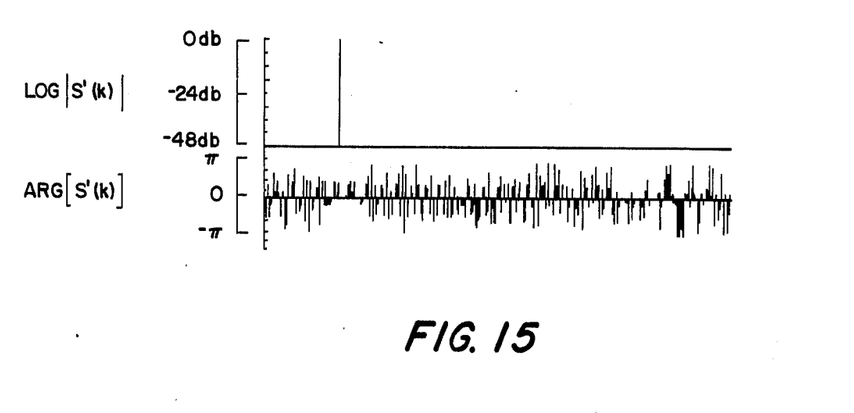
FIG. 15 shows the logarithmic magnitude-phase spectrum of the composite approximation waveform shown in FIG. 13.
Figure 16:
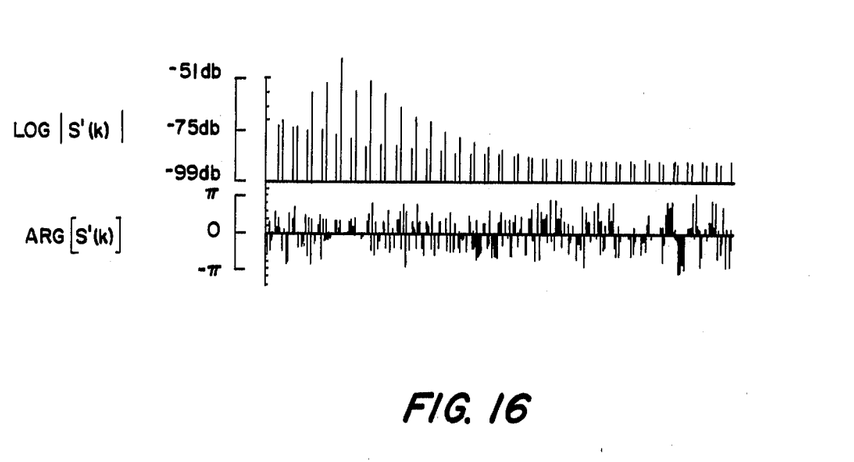
FIG. 16 shows rescaled the logarithmic-phase spectrum of the error function shown in FIG. 14.

The tails of the spectrum of each Hanned segment are then truncated to produce the spectrum of the approximation as before. For this example, only the six largest components in FIG. 11 are retained, which corresponds to throwing away all contributions that are more than about 40 db before the largest one. It is interesting to note that, in FIG. 4, no components in the unHanned segment are below the −40 db level. Finally FIG. 13 show the composite 512 sample approximation waveform obtained by the overlap-Hanned algorith. The error is plotted in FIG. 14. The approximation spectrum, shown in FIG. 15 has no sidelobe components larger than 50 db below the desired component. FIG. 16 is the spectrum of the error alone, which consists primarily of components displaced by multiples of $2/NT_s$, or the reciprocal of half the segment length. The doubling of the effective modulation rate relative to the first algorithm is due to the factor of 2 overlap, since the modulation of each segment is definitely still characterized by the period $NT_s$.

The "overlap-Hanned" synthesis algorithm for discrete components yields very high fidelity with a very small number of non-zero spectral contributions. In particular, a six component approximation empirically appears to yield a maximum error of slightly more than 1%, and maximum spectral sidelobes of about −50 db. Even a 4 cell approximation has less than 5% error, and about −35 db max sidelobe levels.

The foregoing embodiments are merely illustrative of the basic principles of the invention. Obviously, numerous modifications and variations of the present invention are possible in light of the above teachings. Although the component sinusoids of the desired waveform are modulated by a hanning windowing, they may be modulated by any cosine function where 50 percent overlapping of the function produces a unit pulse. For example, Hamming windowing which relies upon the normalized cosine function:

$$A \simeq \frac{0.54 + 0.46 \text{ cosine } (2 \pi f_c t)}{1.08},$$

is an acceptable alternative practice under the teachings of the present invention.

Other alternatives and variations to embodiments of the present invention are the use of approximate magnitudes and phases for reasonable fidelity requirements, the addition of the sinusoidal components to the spectrum after weighting by a filter function when using the overlap/add FFT approach to convolutional filtering, the addition of the sinusoidal components to the spectrum generated by a broadband synthesis algorithm, and the creation of narrowband random processes or slowly varying (in frequency and magnitude) sinusoidal components by appropriate perturbation of the amplitude $A_m$ or the frequency $C_m + CF_m$ for each iteration of the algorithm. In addition, any window function may be used which, when overlapped with some fraction of previous and following windowed segments, produces an unmodulated time waveform envelope. Examples of these acceptable windows are: the "Hamming Window" or a triangular window, each with overlap of one-half segment.

What is claimed as new and desired to be secured by Letters Patent of the United States is:

1. A process for digital synthesis of a complex waveform having one or more sinusoidal components of arbitrary frequency, amplitude, and phase, comprising the steps of:
spectrally describing each of said sinusoidal components in the frequency domain with a spectral description formed by:
selecting for each of said sinusoidal components a set of spectral cells spaced-apart in order by a predetermined frequency, $f_c$, each cell potentially representing any complex value in the frequency domain;
determining for each of said spectral cells the magnitude and phase of a complex value according to a raised cosine modulation function, each value varying in dependence upon the order of the respective one of said spectral cells within its set; and,
adding each complex value to the value represented by the respective one of said spectral cells;
periodically transforming each said spectral description from the frequency domain to the time domain to provide successive samples forming segments of the respective said sinusoidal components; and,
overlapping successive of said segments having an identical frequency by 50 percent of their period to provide unmodulated segments of each of the components.

2. The process as set forth in claim 1, further comprising the steps of:
periodically combining one of each said unmodulated segments at each said arbitrary frequency.

3. The process set forth in claim 1 wherein said sinusoidal components are modulated in amplitude according to the formula:

$A_m = 0.54 + 0.46 \text{ COSINE } (2\pi f_c t).$

4. The process set forth in claim 1 wherein said sinusoidal components are modulated in amplitude according to the formula:

$A_m = 0.5 + 0.5 \text{ COSINE } (2\pi f_c t).$

5. A digital circuit for the electronic synthesis of a desired waveform having m sinusoidal components, comprising:
a first buffer register for receiving and storing the relative amplitude, frequency, and phase of each of said m sinusoidal components;
a second buffer register for receiving and storing in $m$ sets of n spectral cells spaced apart by a predetermined frequency, $f_c$, $m \cdot n$ complex values describing the frequency spectrum of a modulated segment of the desired waveform;
a third buffer register for receiving and storing for each periodic transformation the last N samples of a sampled segment of a modulated waveform; and,
computational means coupled between said first and second buffer registers, and between said second and third buffer registers, for determining for each of the m sinusoidal components, at each of $n$ spaced-apart frequencies, a set of $n$ complex values, $W_m(i)$, where $i$ varies incrementally by one from $(-n/2) + 1$ to $n,/2$ for adding each of the $m \cdot n$ complex values in a prescribed sequence to a different one of said the spectral cells, for periodically performing an inverse discrete Fourier transformation upon the $m \cdot n$ complex values describing the frequency spectrum of a modulated segment of the desired waveform, providing 2N samples of a waveform segment of each of said sinusoidal components modulated in the domain, and for adding the last N samples of each waveform segment with the first N samples of the next waveform segment provided of the same one of the sinusoidal components.

6. The digital circuit set forth in claim 5 wherein $W_m(i)$ is determined according to the formula:

$$W_m(i) = \{A_m e^{j\alpha}m \cdot e^{j\pi(\frac{N-1}{N})(i-CF_m)} \sin\pi(i-CF_m)\} \cdot$$

$$\left\{ \frac{1}{\sin\frac{\pi}{N}(i-CF_m)} - \frac{1}{2}\left( \frac{e^{-j\pi\frac{N-1}{N}}}{\sin\frac{\pi}{N}(i-CF_m-1)} + \frac{e^{j\pi\frac{N-1}{N}}}{\sin\frac{\pi}{N}(i-CF_m+1)} \right) \right\}$$

where $n$ is a selected real, even integer, and $m$ is an index initially equal to one.

7. The digital circuit set forth in claim 5 wherein said sinusoidal components are modulated in amplitude according to the formula:

$A_m = 0.54 + 0.46 \text{ COSINE } (2\pi f_c t 0)$.

8. The digital circuit set forth in claim 5 wherein said sinusoidal components are modulated in amplitude according to the formula:

$A_m = 0.5 + 0.5 \text{ COSINE } (2\pi f_c t)$.

9. A process for digital synthesis of a complex, composite time wave form having M sinusoidal components $S_m(t)$ of relative frequency $F_m$, and relative amplitude $A_m$, where M is a positive, real integer having a value equal to or greater than one, and $m$ is an integer index varying in value from one to M, comprising the steps of:

defining a set of N fixed spectral cell frequencies spaced apart by $f_c$ Hertz the band between zero and $(N-1)f_c$ includes each said frequency $F_m$ for all said sinusoidal components;

determining for each of M said sinusoidal components two frequency parameters, $C_m$ and $CF_m$ respectively, the integer part and the fractional part of the quotient of $F_m$ to $f_c$;

loading the frequency parameters $C_m$ and $CF_m$, and the amplitude $A_m$ of each of said M sinusoidal components into the memory of a first buffer register;

determining the phase $\alpha_m$ of each of the corresponding said M sinusoidal components at the beginning of said time waveform;

storing the phase $\alpha_m$ corresponding to each of said M sinusoidal components in the memory of said first buffer register;

generating in a digital computer adapted to read said frequency parameters, said amplitude, and said phase of each of said M sinusoidal components from the memory of a buffer, a set of $n$ complex values by performing an interative routine comprising the seven steps of:

(1) computing the value $W_m(i)$ where:

$$W_m(i) = \{A_m e^{j\alpha}m \cdot e^{j\pi \frac{(N-1)}{N}(i-CF_m)} \sin\pi(i-CF)\}$$

$$\left\{ \frac{1}{\sin\frac{\pi}{N}(i-CF_m)} - \frac{1}{2}\left( \frac{e^{-j\pi\frac{N-1}{N}}}{\sin\frac{\pi}{N}(i-CF_m-1)} \right. \right.$$

$$\left. \left. + \frac{e^{j\pi\frac{N-1}{N}}}{\sin\frac{\pi}{N}(i-CF_m+1)} \right) \right\}$$

where $n$ is a selected real, even integer, $i$ is an index of $n$ having a value equal to $(-n/2) + q$, $q$ is an index initially equal to one, and $m$ is an index initially equal to one;

(2) adding $W_m(i)$ to the contents of that one of N said spectral cells in the memory of a second buffer register having an index of $(C_m + i)$ to form the frequency spectral cells in the memory of a second buffer register having an index of $(C_m + i)$ to form the frequency spectra of said time waveform;

(3) incrementing the value of $q$ by one;

(4) repeating the preceeding three steps until the value of $q$ exceeds the value of $n$;

(5) incrementing the current phase $\alpha_m$ by $\pi(C_m + CF_m)$ radians;

(6) incrementing the value of $m$ by one; and, (7) repeating the steps set forth in the preceding six paragraphs until the value of $m$ exceeds the value of M;

applying in said digital computer an inverse discrete Fourier transform to the contents of the N cells containing said frequency spectra to produce a modulated waveform segment having a set of 2N real time samples, $TS_{rp}$, for which $r$ varies in value by successive increments of one;

adding in said digital computer the first N real time samples belonging to the set $TS_{rp}$, for which $r$ varies in value from one to N, to the last N real time samples belonging to the set $TS_{r(p-1)}$, for which $r$ varies in value from N+1 to 2N, to form an unmodulated segment of said time waveform;

storing the last N real time samples belonging to the set $TS_{rp}$, for which $r$ varies in value from N+1 to 2N, in the memory of a third register;

incrementing the value of $p$; and, repeating the steps set forth in the preceding 11 paragraphs whereby an output waveform of successive segments of N real time samples is digitally synthesized.

10. The process as set forth in claim 9 wherein said waveform segment is modulated in amplitude according to the formula:

$A_m = 0.5 + 0.5 \text{ COSINE } (2\pi f_c t)$.

11. The process as set forth in claim 9 wherein said waveform segment is modulated in amplitude according to the formula:

$$A_m = 0.54 + 0.46 \text{ COSINE } (2\pi f_c t).$$

12. The process as set forth in claim 9 wherein $n$ equals 4.

13. The process as set forth in claim 9 wherein $n$ equals 6.

* * * * *